United States Patent [19]

Wareham

[11] 4,126,875

[45] Nov. 21, 1978

[54] DUAL FILM CAMERA

[75] Inventor: Richard R. Wareham, Marblehead, Mass.

[73] Assignee: Polaroid Corporation, Cambridge, Mass.

[21] Appl. No.: 756,140

[22] Filed: Jan. 3, 1977

[51] Int. Cl.$^2$ .................. G03B 17/50; G03B 19/06
[52] U.S. Cl. .................................. 354/86; 354/150; 354/173; 354/210
[58] Field of Search .............. 354/210, 104, 86, 170, 354/173, 83, 150

[56] References Cited

FOREIGN PATENT DOCUMENTS 2,461,193  7/1975  Fed. Rep. of Germany ........... 354/210

Primary Examiner—John Gonzales
Attorney, Agent, or Firm—David R. Thornton

[57] ABSTRACT

A camera for use with self-developing film exposes, advances and processes film selected from one of two supplies at either of two exposure locations. Each film supply feeds exposed film to a set of three processing or spread rollers mounted at a corner of the camera housing. One roller is common to processing paths for both film supplies. Selection of one of the film supplies for exposure also selects the direction of rotation of a reversible motor that drives the common roller. When the film supplies are cassettes of card-like, self-contained film units, the reversible motor also drives a pair of pick arms that advance film units from the selected cassette to an associated pair of the processing rollers. The pick arms are mounted and linked to the reversible motor so that the direction of rotation automatically drives the "selected" pick arm to engage and advance the exposed film unit towards its processing rollers while driving the "non-selected" pick arm to avoid engagement with the non-selected film unit.

16 Claims, 13 Drawing Figures

DUAL FILM CAMERA

BACKGROUND OF THE INVENTION

This invention relates in general to photographic apparatus. More specifically it relates to cameras that can expose, advance and process film selected from one of two separate supplies of self-developing film loaded in the camera.

In both conventional and self-developing photography, cameras that load two separate film supplies are known. For example, U.S. Pat. Nos. 2,616,342 to Thompson and 2,988,973 to Bohm et al. describe cameras that use a rotatable mirror to expose one of two rolls of conventional film. U.S. Pat. Nos. 3,608,456 to Hauser and 3,643,570 to Reid et al. describe a camera in which an image splitter simultaneously exposes both conventional roll film and self-developing film.

In recent years, self-developing films of the so called integral positive-negative type have become increasingly popular. These film units, in contrast to the earlier "peel apart" film, include all of the photosensitive and photoprocessing compositions in a self-contained laminar unit. U.S. Pat. Nos. 3,415,644; 3,651,746 and 3,779,770 disclose a form of self-contained film unit which is exposed from the same side on which the photographic product is viewed, as well as suitable holders for a stacked supply of these film units forming a cassette. Such film units have a transparent outer layer at only one surface and generally are exposed with actinic light reversed an odd number of times.

In contrast, U.S. Pat. Nos. 3,761,271 and 3,765,887 describe a self-contained film unit which is exposed and viewed from opposite sides; they also describe a container for a stack of the units. This type of film unit has two transparent outer surface layers. It commonly is exposed with light which has undergone an even number of reversals.

Since both of these films are presently on the market, it is desirable to have a camera that can accept either type of film. This capability is particularly important where the camera is used in different localities where only different ones of the two films are available.

A commonly assigned U.S. application Ser. No. 529,904 filed on Dec. 5, 1975 by William Plummer for "Photographic Apparatus" describes a camera that loads both types of self-contained film units and exposes whichever one the user selects. In one form, the camera employs a pivoted reflecting element that directs light to the "odd number" film in one position, and allows an uninterrupted, "straight-in" exposure of the "even-number" film in a second position. This camera employs a spread roll system which requires that both types of film units have the same thickness and employ identical processing. Further, the camera employs a separate pick mechanism for each set of film units. These and other characteristics restrict the widespread manufacture and use of the camera construction.

It is therefore an object of this invention to provide a dual film camera that reliably advances and processes self-developing film units from either of two film supplies with an integrated mechanical arrangement that minimizes the duplication of components for each film supply and is compact.

Another object of the invention is to provide selective film advance and processing mechanisms that are reliable and have a relatively low cost of manufacture.

Yet another object of the invention is to provide film advance and processing mechanisms for a dual film self-developing camera that are driven by a single motor and automatically advance and process a film unit from the film supply selected for exposure in response to that selection.

SUMMARY OF THE INVENTION

A camera according to the invention houses two supplies of self-developing film and has a mechanism for selectively exposing film in only one of the supplies. A set of three processing rollers is fixedly mounted in a corner of the camera housing intermediate the discharge ends of both supplies and a pair of slots formed in the housing corner. Each discharge end and an associated exit slot define a film processing path that threads through two of the rollers. One roller thus is common to both processing paths and forms a nip along each processing path with one of the other rollers. The common roller is driven by a reversible motor whose direction of rotation is determined by the selection mechanism, so that processing occurs only along the processing path associated with the selected film supply.

When the film supplies are cassettes of self-contained, card-like film units, the reversible motor also operates a drive mechanism operatively connected to a pair of pick arms, each of which advances or indexes film units from one associated cassette. The direction of rotation of the motor, and hence of the drive mechanism, automatically drives the pick arm associated with the selected cassette into indexing engagement with an exposed film unit as the arm moves toward the processing rollers. The drive mechanism also operates the other pick arm throughout this motion, but in a reverse direction so that it does not displace film units in the non-selected cassette.

In a preferred form, the drive mechanism includes a pair of drive wheels rotatably mounted on opposite sides of the cassette. One end of each pick arm is pivotally mounted on a pin carried on an associated drive wheel. Each pick arm also pivots on a pin engaged in a slot extending along the longitudinal axis of the pick arm at a point intermediate its ends. The pick mechanism preferably includes a spring that urges the free end of each arm toward the trailing edge of one cassette-bound film unit. Also, the pivoted end of each pick arm preferably engages the drive wheel pins in an elongated slot oriented transversely to the direction of the film advance.

These and other features and objects of the invention will be more fully understood from the following detailed description of the preferred embodiments, which should be read in light of the accompanying drawings.

DETAILED DESCRIPTION OF THE ILLUSTRATED EMBODIMENTS

Figure 1:
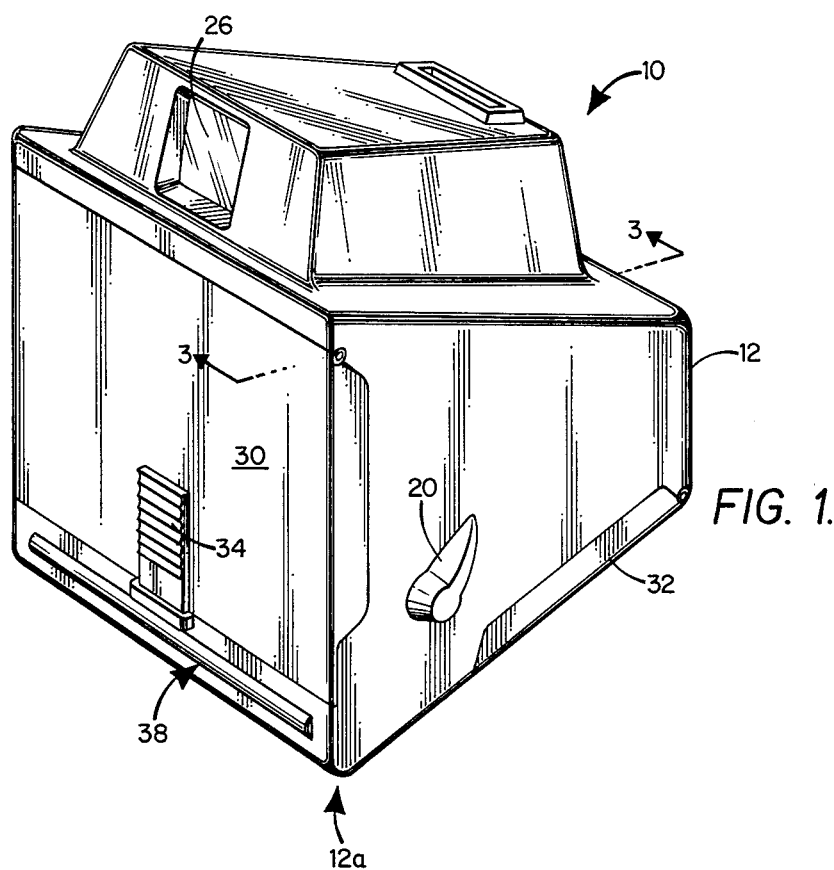
FIGS. 1 and 2 are perspective views, from the back and the front, respectively, of a dual film camera according to the invention.
Figure 2:
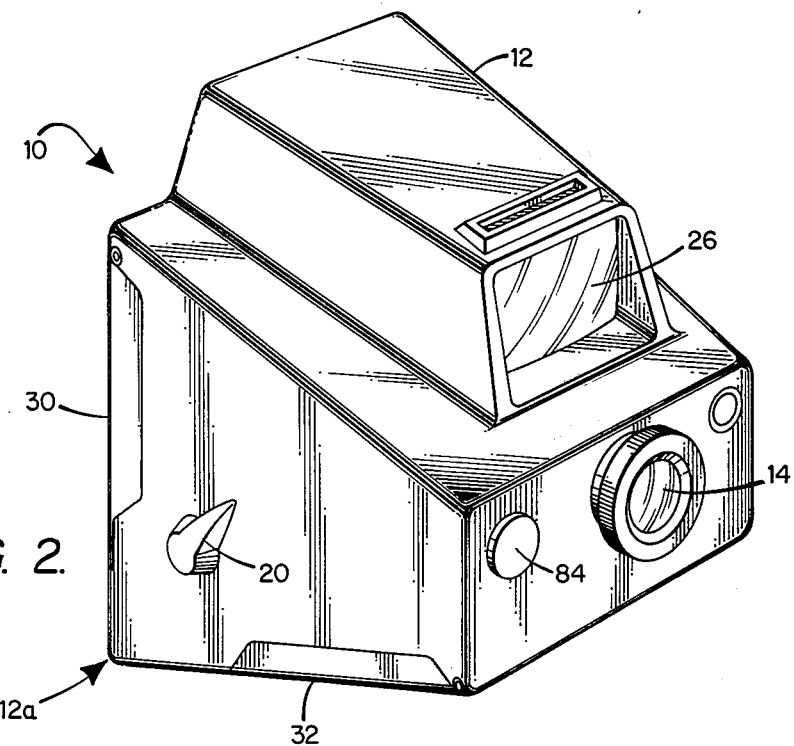

FIGS. 1–4 show a self-developing camera 10 having a rigid housing 12 that is light tight except at selected openings. The housing 12 mounts an objective lens 14 that focuses light from an object field to either of two film planes located within an exposure chamber 16.

A pivoted reflecting element 18 is manually roatable by an externally accessible selector switch 20 to direct light rays from the objective lens 14 selectively to either of two film cassettes 20 and 22 replaceably mounted in the exposure chamber. The foremost film unit in each cassette is substantially coincident with one film plane. When the reflecting element 18 is in a "raised" position, shown in solid lines in FIG. 3, it reflects light rays, represented by an axial ray 24, toward the film plane of the cassette 20. When the reflecting element 18 is in a "lowered" position indicated in phantom in FIG. 3, light rays entering the camera by-pass the reflecting member 18 and proceed directly to the cassette 22.

Figure 3:
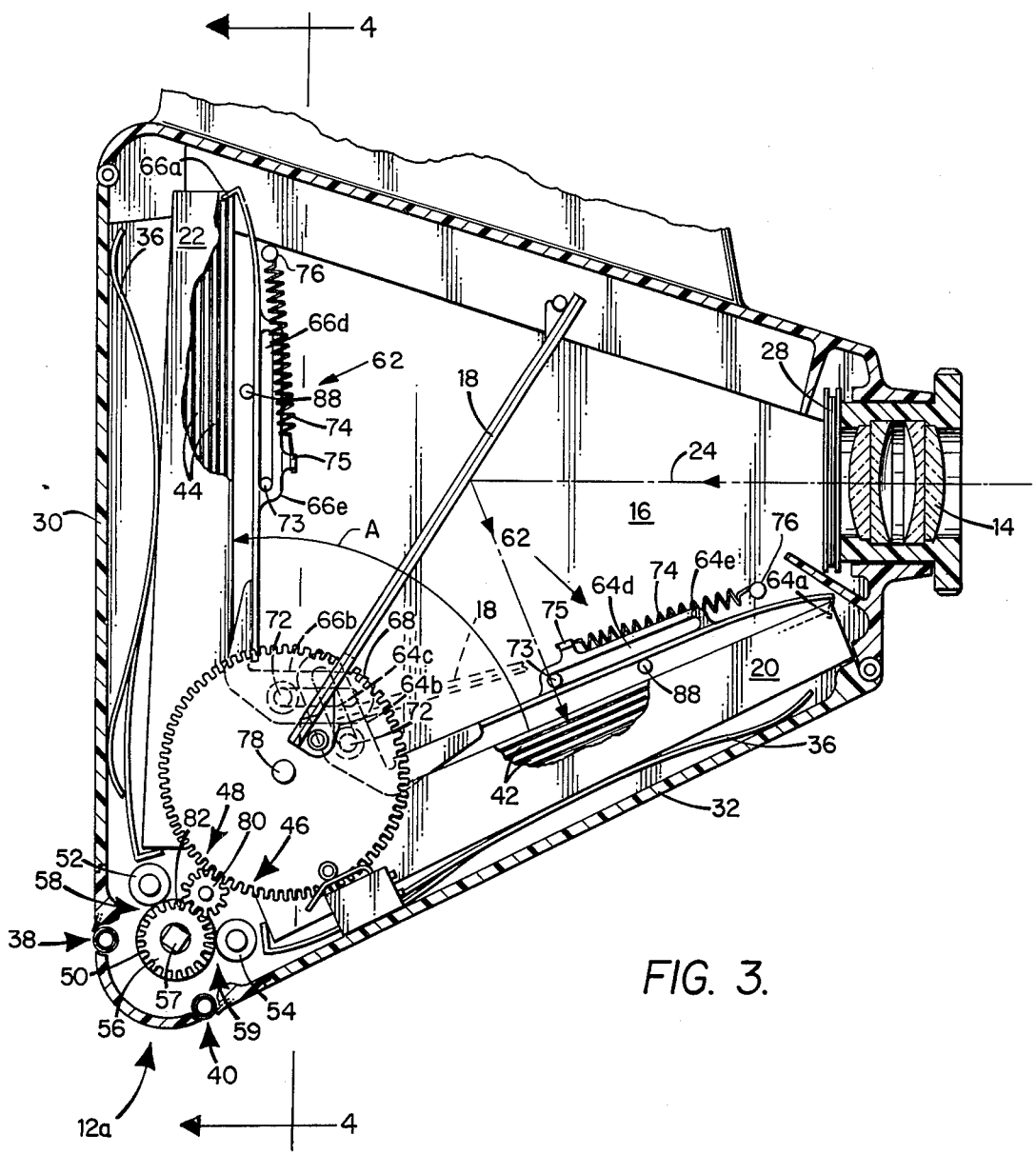
FIG. 3 is a view in vertical section taken along line 3—3 in FIG. 1.

The camera 10 mounts a standard viewfinder 26 and conventional exposure control mechanisms 28. A film loading door 30 for the cassette 22 and a similar door 32 for the cassette 20 form portions of the housing 12. A latch, such as latch 34, holds each of the doors 30 and 32 closed. Conventional snap fit and abutment arrangements, together with springs 36 mounted on the doors 30 and 32, accurately locate the cassettes within the camera. When loaded, the cassettes 20 and 22 are mutually inclined with respect to one another at an acute angle A (FIG. 3). With other factors such as the film format given, the magnitude of this angle depends on the focal length of the lens 14. A pair of film exit slots 38 and 40 are formed in a housing corner 12a in line with the discharge ends of the cassettes 20 and 22, respectively. An extensible, retractable light shield of the type described in U.S. Pat. No. 3,940,774 is mounted at each exit slot.

Figure 4:
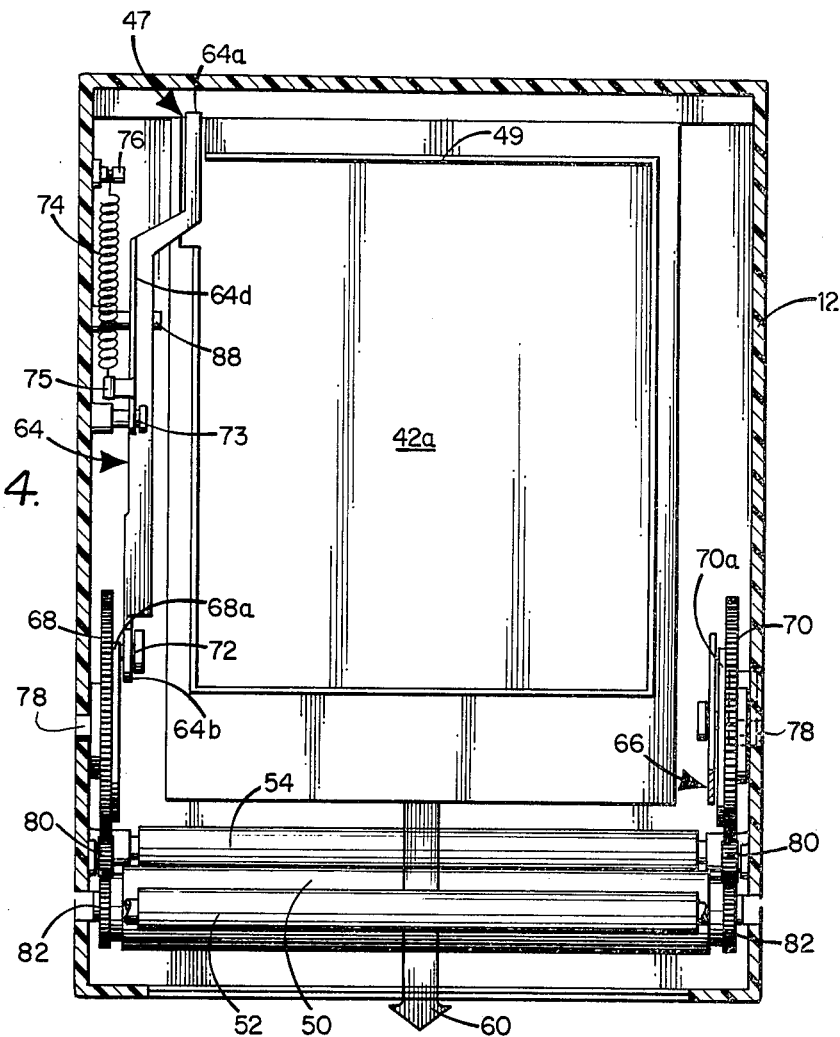
FIG. 4 is a view in horizontal section taken along line 4—4 in FIG. 3.
Figure 5:
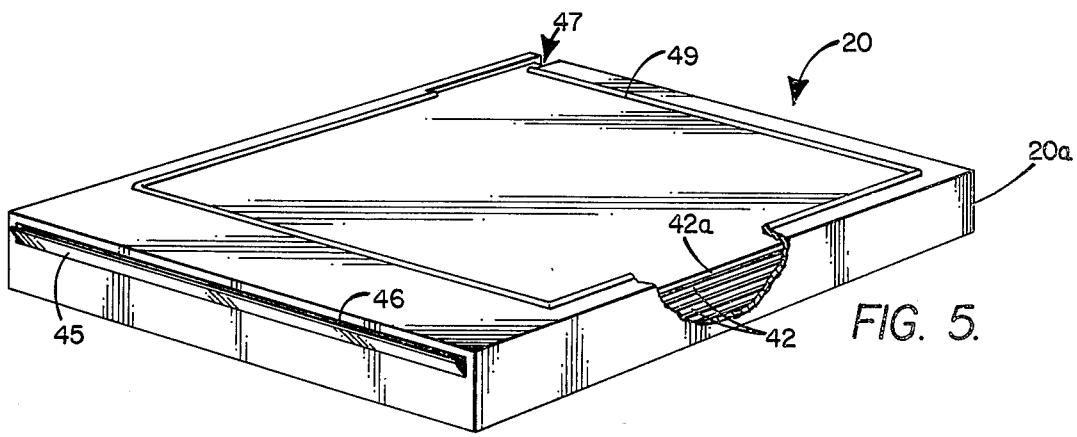
FIG. 5 shows a prior art film cassette for use in the camera.

With reference to FIGS. 3–5, the cassettes 20 and 22 have generally rectangular casings 20a and 22a, respectively that hold a battery (not shown) and an overlying stack of separate, card-like film units 42 and 44, respectively. The film units 42 and 44 are self-developing and self-contained units of the so-called integral positive-negative type. The film 42 in the cassette 20, however, are exposed and viewed from the same side of the film unit, while the units 44 are exposed and viewed from opposite sides of the film unit. The former film unit requires the exposing light rays that undergo an odd number of reversals; the latter type requires an even number of reversals (including no reversals). The reflecting element 18 provides the required reversal for the film units 42. The film units 42 can be of the type described in U.S. Pat. Nos. 3,415,644; 3,651,746 and 3,779,770 and sold by the Polaroid Corporation under the registered designation "SX-70". The details of the cassette structure are also described in the foregoing patents. The film units 44 can be of the type described in U.S. Pat. Nos. 3,761,271 and 3,765,887 and as marketed by the Eastman Kodak Company under the trade designation "Instant Print."

As shown in FIG. 5, the casing 20a of the illustrated cassette 20, which is also typical of the casing 22a, has a film discharge slot 46 formed in a front end wall. A flexible flap 45 covers the discharge slot to prevent inadvertant exposure of the stored film units. The casing also has a pick access slot 47 and an exposure window 49 formed in its "upper" wall facing the image carrying light. The pick access slot extends longitudinally from the casing rear end wall toward the discharge end.

Figure 6:
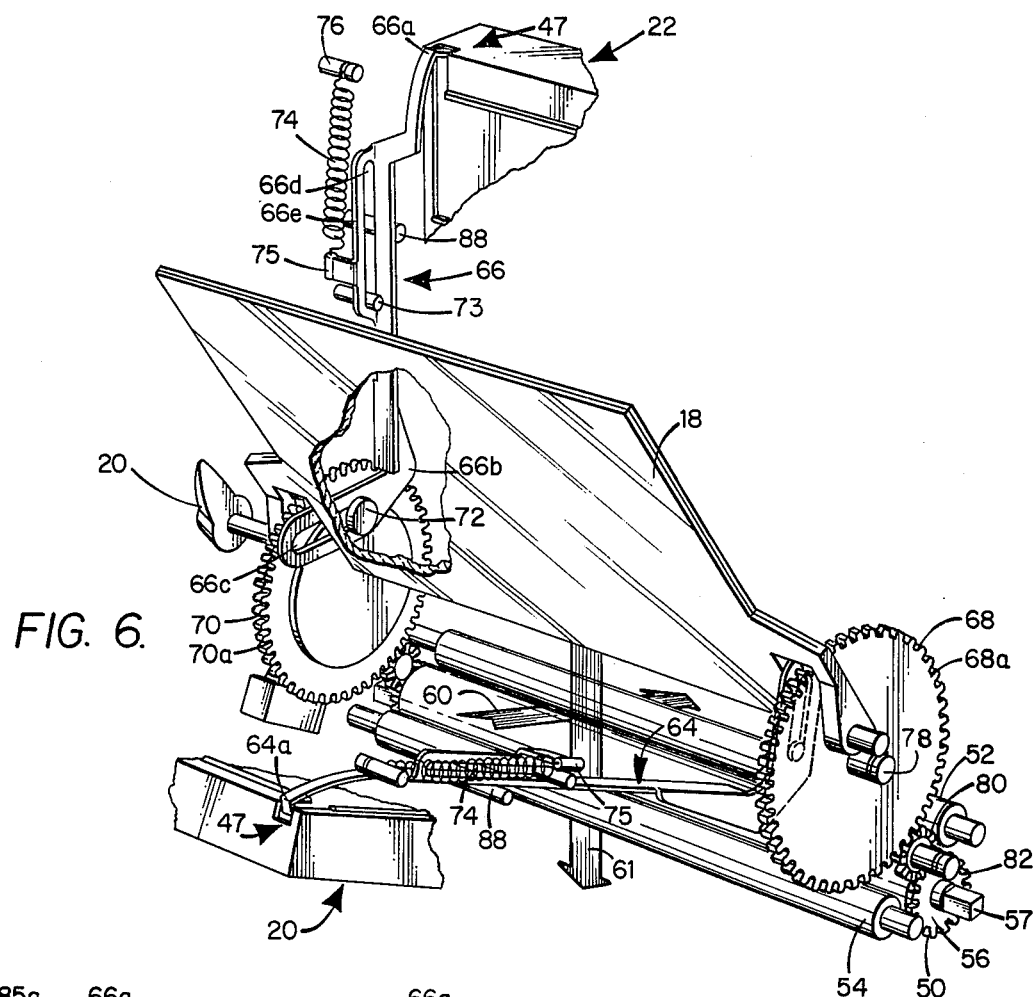
FIG. 6 is a detailed view in perspective of the pick arms, pick arm drive mechanism and processing rollers shown in FIGS. 3 and 4.

With reference to FIGS. 3, 4 and 6, a principal feature of the invention is three processing rollers 50, 52 and 54 located in the housing corner 12a intermediate the discharge ends of the cassettes and the housing exit slots 38 and 40. The rollers 52 and 54 are rotatably mounted on pins secured to the housing 12. Alternatively, these rollers can be mounted in a support bracket of the general type described in U.S. Pat. No. 3,974,510. The roller 50 is carried on a reversible electrical motor 56 located within the roller 50 and having a drive shaft 57 that rotates the surrounding roller 50 in one of two directions. The motor 56 and the roller 50, like the rollers 52 and 54, are mounted to the housing 12 in fixed positions. The roller 50 and the roller 52 form a roller-pair having a nip 58 that is generally coplanar with the foremost film unit 42a, cassette discharge slot 46 and the film exit slot 38, which together define a film processing path 60. Similarly, the roller 50 and the roller 54 form a second roller-pair having a nip 59 that is generally coplanar with the foremost film unit 44a, the cassette discharge slot 46 and the film exit slot 40, which together define a second film processing path 61. The processing rollers 52 and 54 are of a construction conventional for processing self-developing film. The roller 50, which is common to both the film processing paths 60 and 61, likewise has a conventional construction except that it is mounted to rotate about the motor 56 and preferably has a diameter that is generally twice as large as that of the rollers 52 and 54.

The direction of rotation of the motor 56, and hence the roller 50, is controlled by the position of the reflecting element 18. When the element 18 is to expose a film unit in cassette 20, the motor 56 drives the processing roller 50 counterclockwise (FIG. 3) to advance the film unit entering the nip 58 to the exit slot 38. When the reflecting element 18 is lowered to expose a film unit in cassette 22, the motor 56 drives the processing roller 50 clockwise (FIG. 3) to advance a film unit 44a entering the nip 59 to the exit slot 40. This arrangement and mode of driving the processing rollers is highly compact since it allows the nips of the paired processing rollers for both processing paths 60 and 61 to be located a relatively short distance from both the cassette discharge slots and the film exit slots. It should also be noted that while the direction of rotation will advance a "selected" film unit for processing, it is directly opposite to the direction of advance that processes the other film unit.

With further reference to FIGS. 3, 4 and 6, another principal feature of the invention is a pick mechanism, indicated generally at 62, having a pick arm 64 associated with the cassette 20, a pick arm 66 associated with the cassette 22, and a pick arm drive mechanism that includes a pair of drive wheels 68 and 70 associated with the pick arms 64 and 66, respectively. Each pick arm is an elongated member that extends from a driven end 64b, 66b generally the length of the associated cassette to hoe-like, angled pick portion 64a, 66a at the free end thereof. The pick arms are positioned over the cassettes so that the pick portions 64a and 66a can enter the cassettes through the access slots 47, 47 to engage the trailing edge of the foremost film unit.

Each pick arm is pivotally mounted at the driven ends 64b, 66b on a pin 72, 72 secured to the inner face of the drive wheels 68 and 70. Each pin 72, 72 is free to travel in an elongated closed slot 64c, 66c that extends on the pick arm generally in a direction perpendicular to the length of the arm. Each arm 64, 66 is also pivotally mounted on a pin 73, 73 slidably engaged in a closed slot 64d, 66d formed in the arm portion 65e, 66e located intermediate its ends. Each slot 64d, 66d extends generally parallel to the arm length to allow the arm to reciprocate in a direction generally parallel to the associated film processing path 60 and 61, respectively. A spring 74, 74 biases each pick arm toward the rear of its associated cassette and "downwardly" (e.g., to the top and into the plane of FIG. 4) to bring the pick end 64a, 66a into engagement with the trailing edge of the foremost film unit in the associated cassette. One end of each spring 74, 74 is engaged to a tab portion 75, 75 extending from the pick arm portion 64e, 66e. The other spring end is secured to a pin 76, 77 fixed to the camera housing. The pick arms are preferably formed of a stiffly resilient sheet material such as spring steel, which can be stamped and bent into the configuration shown. As FIG. 4 also shows, the driven ends 64b and the arm portions 64e, 66e are offset laterally from the pick portion 64a, 66a to be offset to the slide from the cassettes.

The drive wheels 68 and 70 are rotatably mounted on shafts 78, 78 that are secured to the housing 12. Each drive wheel has a toothed portion of reduced diameter 68a, 70a facing the housing, and these gear teeth mesh with idler gears 80, 80 that in turn mesh with gears 82, 82 secured to the drive shaft 57. The gears 82 have the same diameter as the driven processing roller 50. The drive wheels 68 and 70 therefore rotate in unison with and in the same direction as the processing roller 50. The diameter of the roller 50 is, however, smaller than the diameter of the drive wheels so that the processing roller will make several revolutions for each full revolution of the drive wheels. Since the drive wheels execute one full revolution during each operating cycle, the relative diameters of these elements are chosen so that during each operating cycle, the processing roller 50 rotates a sufficient number of revolutions to advance a film unit through the processing rollers.

To operate the camera 10, the user first moves the switch 20 to select film units in either the cassette 20 or the cassette 22 for exposure. This selection switches the reversible motor 56 to rotate in the direction which will advance and process the selected film units. To take a picture, the user presses a shutter release button 84 (FIG. 2), which both release the shutter and, after a slight delay, activates the motor 56. Rotation of the motor, powered by batteries (not shown) bound in the camera (typically within the selected cassette), rotates the gear train 82, 82, 80, 80, 68a and 70a to drive both of the wheels 68 and 70 in the same direction as the processing roller 50.

Figures 7, 8:
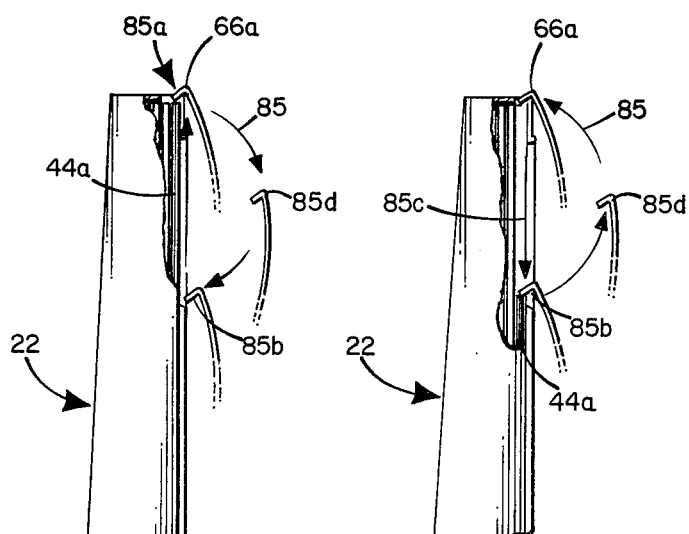
FIG. 7 is a detailed view of the upper pick arm shown in FIG. 6 showing the complete cycle of motion of a non-selected pick arm.
FIG. 8 is a view corresponding to FIG. 7 showing the complete cycle of motion of the same pick arm when it is selected.

The picking action is best shown in FIGS. 6–9. In particular, FIG. 7 shows the complete cycle of motion, or locus of the pick end 66a along a path 85 when the cassette 22 associated with the pick 66 is not selected for exposure. FIG. 8 shows the complete cycle of motion along a like path 85 for the same pick end 66a when the cassette 22 is selected. While the path 85 is the same, the movements of the pick end along the path in FIGS. 7 and 8 are opposite. With the counterclockwise direction of FIG. 8, the pick indexes the film unit 44a; in the opposite direction of FIG. 7 the pick does not index the film unit.

This path traversed in either direction can be viewed as a coordinated combination of linear reciprocal motion in two mutually perpendicular directions, a longitudinal direction that is generally parallel to the associated film processing path, and a transverse direction that is generally perpendicular to the film processing path. The longitudinal reciprocation is between a first limit position 85a where the pick end is at an exteme rear position and adapted to hook the trailing edge of the foremost film unit, and a second limit position 85b where the pick end is at an extreme forward position. The maximum travel in the longitudinal direction is determined by the radial position of the pin 72 on the wheel 68. Twice this distance should be at least equal to the separation between the front edge of the foremost film unit in its initial exposure position and the nip of the processing rollers. The slot 64d in the body of the pick arm must be sufficiently long to allow the pick arm to travel this distance. The transverse reciprocation is between a lower limit position 85c in which the pick end is in contact with the foremost film unit and an upper limit position 85d in which the pick end is spaced a maximum distance from the foremost film unit.

Figure 9A:
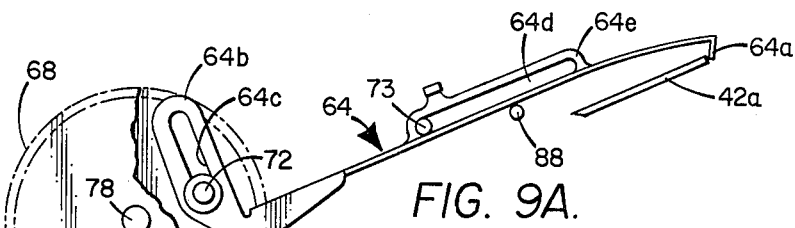
FIGS. 9a–9e are simplified views in side elevation of a selected pick arm and the drive mechanism of FIG. 6 illustrating the sequence of positions of the pick arm with respect to the associated film cassette through one cycle of operation.
Figure 9B:
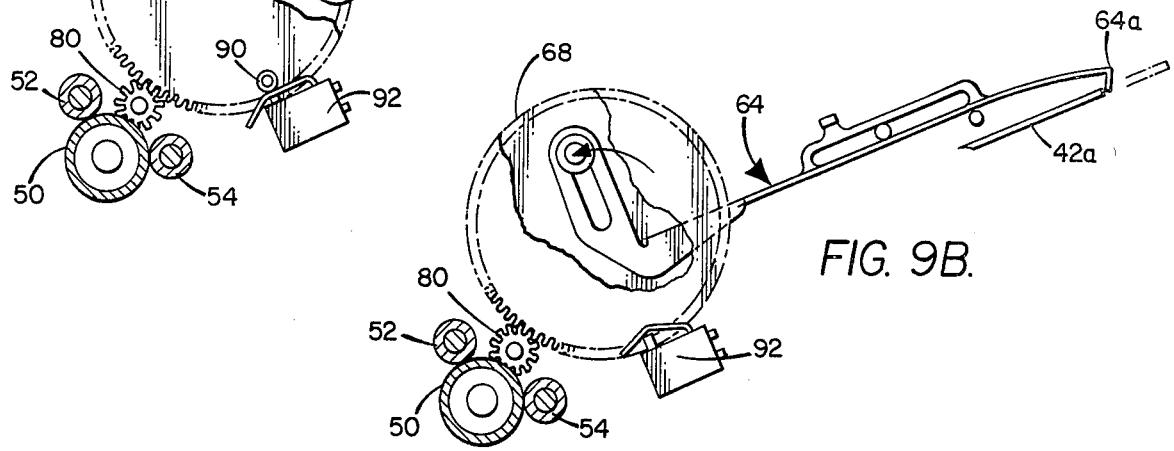

FIGS. 9a–9e show the relation between the drive mechanism 62 and the pick arm 64 sequentially through one complete cycle of revolution where the pick arm 64 is "selected." The drive wheels 68 and 70 rotate in a counterclockwise direction from an initial position shown in FIG. 9a. In this initial position the pick portion 64a is hooked behind the trailing edge of the film unit 42a (FIG. 4), the pin 72 is at the extreme lower end of the slot 64c and the pin 73 is at the extreme forward position in the slot 64d. After a quarter revolution to the position shown in FIG. 9b, the pick portion 64a indexes the film unit 42a along the film processing path 60 approximately half of the distance to the roller nip 58. At the same time the pin 72 moves to the extreme upper end of the slot 64c to reduce further transverse motion of the pick portion 64a toward the film unit.

Figure 9C:
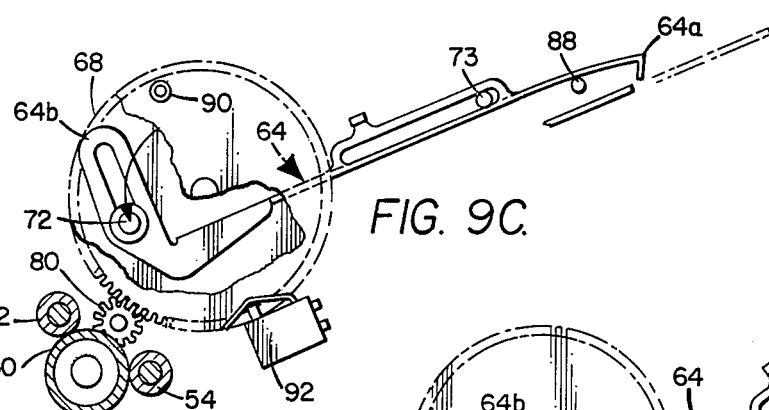
Figure 9D:
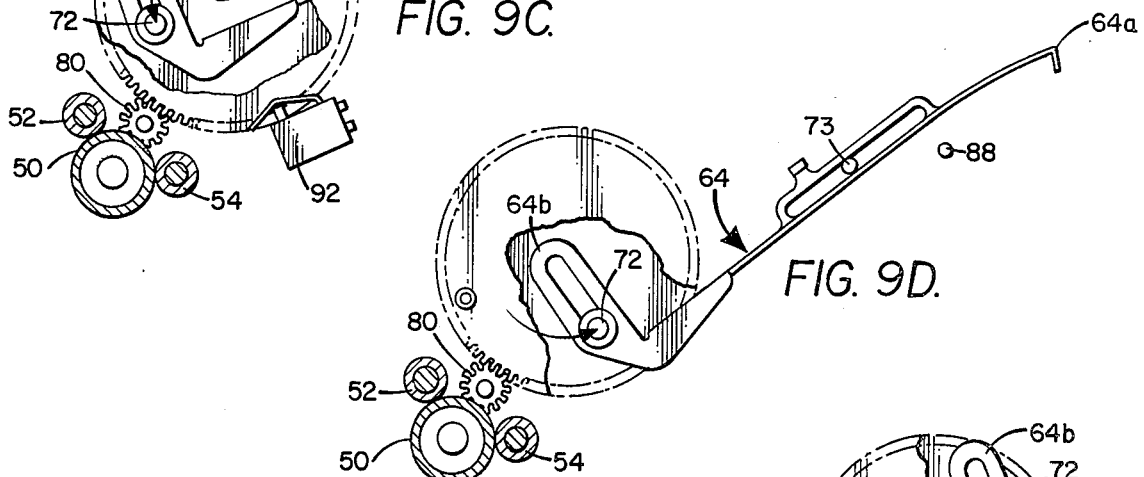
Figure 9E:
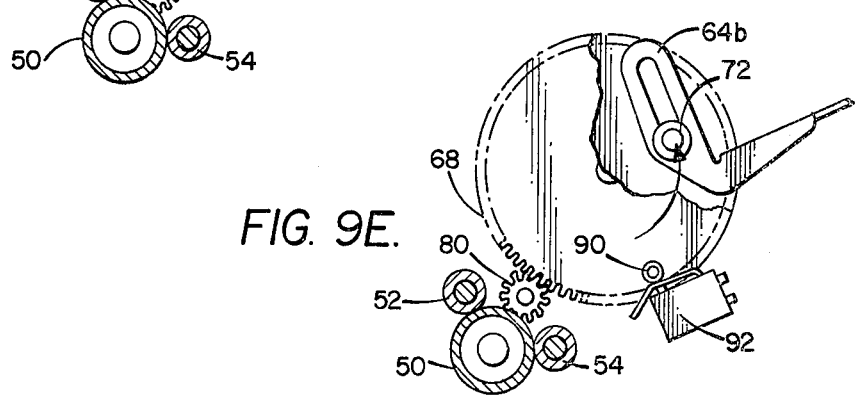

The next quarter revolution to the position shown in FIG. 9c carries the film unit to a point where its leading edge is engaged in the nip 58. The rollers 50 and 52 then drive the film unit through the nip to the camera exit slot 38, thereby initiating the development of the unit and discharging it from the camera. As the advancing film unit 42a leaves the cassette, the following film unit 42 in the cassette is urged upwardly to the foremost portion by a cassette spring (not shown). During this second quarter of revolution the pin 72 moves to the lower end of the slot 64c. Also, a housing-mounted pin 88 located under the pick arm adjacent its pick end 64a cams the pick arm upwardly to ensure that it is clear of the following film unit 42 before the pick arm begins to move back towards its initial position.

During the third quarter of the cycle, the pin 72 drives the end 64b of the pick arm downwardly causing the pick end 64a to move upwardly to the limit position 85d. The last quarter of revolution carries the pick portion back to its initial position 85a (FIGS. 9a and 9e), where it is ready to repeat the cycle for the following film unit. During this last quarter revolution, the spring 74 (FIG. 4) ensures that the pick arm is properly positioned to hook the succeeding film unit.

As the wheel 68 returns to the initial position, a pin 90 mounted on the inner face of the wheel engages and triggers the microswitch 92 to deactivate the motor 56. The diameters of the spread roller 50 and of the drive wheels must be selected so that the film unit has advanced completely through the nip 58 before the motor 56 is deactivated. By way of illustration but not of limitation, with a film unit 42 of the type sold by Polaroid Corporation under the registered designation "SX-70," the spread roller 50 preferably has a diameter of one-half inch and the drive wheel has a diameter of approximately one and three-quarter inches. With these dimensions, the spread roller executes approximately three and a half revolutions during one cycle of operation.

At the same time as the "selected" pick arm (shown in FIG. 9 as the pick arm 64) follows the cycle 85 depicted in FIGS. 8 and 9, the nonselected pick arm follows the path 85 as shown in FIG. 7. FIG. 9 describes the FIG. 7 "non-selected" motion when viewed in reverse order, that is beginning with FIG. 9e and ending with FIG. 9a, which corresponds to a clockwise rotation of the wheel 68. In this cycle, the pick is spaced from the film unit during the movement from the first limit position 85a to the second limit position 85b. As a result, the nonselected film unit is not indexed or "picked" from the unexposed cassette. During the return movement back to the first limit position 85a, the picks slide over the top surface of the foremost film unit, but movement of the film unit is blocked by the rear end wall of the cassette.

There has been described a dual film camera that has a compact, relatively uncomplicated mechanism for advancing and processing film units from one of two film supplies along one of two distinct processing paths. The overall mechanism is driven by a single bidirectional motor that is conveniently mounted within one of the spread rollers for enhanced compactness and to reduce the complexity of the gear trains and linkages. The processing rollers are fixedly mounted within the camera to provide a capability to adjust for different film products. The term "fixedly" is used herein in this context to include resilient bias on the rollers, as is found in commercially available self-developing cameras; the point is that the rollers do not shift position as the user selects one film or the other.

There has also been described a compact and uncomplicated pick mechanism that is powered by the same bidirectional motor that drives the processing mechanism. The pick mechanism features a pair of pick arms which are driven simultaneously with a motion that automatically disables film advance by the pick arm associated with the unexposed film supply. Moreover, this selective pick operation is activated solely by the direction of rotation of the motor.

While the invention has been described with reference to a camera that loads self-contained, integral negative-positive film units, it is equally applicable to other types of self-developing film that utilize spread rollers to initiate development including earlier "peel apart" self-developing film. It will be understood, however, that the pick mechanisms described herein may not be compatible with these earlier forms of self-developing film.

Further, it is anticipated that various alternative mechanical arrangements for processing and picking the film units will become apparent to those skilled in the art. For example, while the invention has been described with reference to a single driven roller 50 common to two processing paths, it is within the scope of the invention to drive the idler rollers 52 and 54 rather than the roller 50. Similarly, while the roller and pick mechanisms are preferably driven by a reversible motor mounted inside the roller 50, suitable drive means can include one or several motors mounted in other locations within the camera. However, it should be noted that additional motors and alternative mounting locations will typically involve additional costs and adversely affect the compactness of the camera. Still further, it is contemplated that alternative mechanical arrangements for mounting and driving the pick arms in the manner described will occur to those skilled in the art. Such modifications can include alternative mounting arrangements for the drive wheels and pick arms such as securing pivot pins on the pick arms that slideably engage slots formed on the drive wheels or other guide members. It is also contemplated that the processing rollers 52 and 54 can be spring mounted to accept film of varying thickness and to provide an enhanced pressing force on the film units as they pass through the nips 58 and 59.

These and other modifications will become apparent to those skilled in the art from the foregoing description and accompanying drawings. Such modifications are intended to fall within the scope of the appended claims.

What is claimed and secured by Letters Patent is:

1. In a self-developing photographic camera for exposing and processing film at either of first and second image planes and having image directing means for selectively directing an optical image from a taking lens to either image surface, and having means for advancing exposed film from each such image plane along a respective one of first and second film advance paths, the improvement comprising
   A. first, second and third processing rollers,
   B. means fixedly mounting said rollers in the camera with the second roller forming a first nip with said first roller along said first film advance path and forming a second nip with said third roller along said second film advance path, and
   C. bidirectional drive means for rotatably driving said rollers in a first rotational condition when said image directing means directs the image to said first plane, and in the opposite, second rotational condition when said image directing means directs the image to said second plane.

2. In a self-developing camera according to claim 1, the further improvement wherein said bidirectional drive means drives one of said processing rollers.

3. In a self-developing camera according to claim 2, the further improvement wherein said second roller is the driven roller.

4. A camera for use with first and second cassettes, each of said cassettes holding a plurality of self-developing film units in stacked relationship with a photosensitive layer of the foremost unit of the stack coincident with a film plane, said film units in said first cassette being of a type that requires an odd number of image reversals and said film units in said second cassette being of a type that requires an even number of image reversals, and each cassette having a discharge slot located at one end and a pick access slot formed at an opposite end, said foremost film unit of each said cassette being moveable in a first direction relative thereto to exit said cassette through said discharge slot thereof, said camera comprising A. a housing having a corner and having means for replaceably securing said first and second cassettes therein with said discharge slot of each cassette positioned proximate to said corner, and having a pair of exit slots formed therein, said exit slots together with said cassette discharge slots defining first and second film processing paths associated with said first and second cassettes, respectively, B. an objective lens mounted on said housing for focusing an image at said film planes, C. means for directing said image from said objective lens to a selected one of said cassettes to expose the foremost film unit therein.

D. first, second and third processing rollers,

E. means for fixedly mounting said rollers within said housing at said one corner thereof, said second and first rollers forming a nip disposed along said first film processing path and said second and third rollers forming a nip disposed along said second film processing path, and F. means for rotating at least one of said rollers associated with each of said film paths in a direction corresponding to the selection condition of said image directing means, said rotating means operating said first and second rollers for advancing a film unit along said first film processing path in said first direction when said first cassette is selected for exposure, and operating said first and third rollers for advancing a film unit along said second processing path in said first direction when said second cassette is selected for exposure.

5. A camera according to claim 4 wherein said rotating means drives said second roller.

6. A camera according to claim 5 wherein said first and second film processing paths intersect and wherein said second roller is located adjacent said intersection of said first and second film processing paths.

7. A camera according to claim 4 wherein said image directing means comprises a reflecting element pivotable between a first position in which said reflecting element directs the image to said first cassette and a second position in which said reflecting element directs the image to said second cassette.

8. A camera according to claim 7 wherein said rotating means is a reversible motor that rotates in one direction when said reflecting element is in said first position and rotates in the opposite direction when said reflecting element is in said second direction.

9. A camera according to claim 8 wherein said reversible motor is mounted within said second roller.

10. A camera for use with first and second cassettes, each of said cassettes holding a plurality of self-developing film units in stacked relationship with a foremost unit of the stack coincident with a film plane, said film units in said first cassette being of a type that requires an odd number of image reversals and said film units in said second cassette being of a type that requires an even number of image reversals, and each cassette having a discharge slot located at one end and a pick access slot formed at an opposite end, said foremost film unit of each said cassette being moveable in a first direction relative thereto to exit said cassette through said discharge slot thereof, said camera comprising A. a housing having a corner and having means for replaceably securing said first and second cassettes therein with said discharge slot of each cassette positioned proximate to said corner, and having a pair of exit slots formed therein, said exit slots together with said cassette discharge slots defining first and second film processing paths associated with said first and second cassettes, respectively, B. an objective lens mounted on said housing for focusing an image at said film planes, C. means for directing said image from said objective lens to a selected one of said cassettes to expose the foremost film unit therein, D. means for processing said film units along said processing paths, and E. means for indexing said foremost film unit from said exposure position in each said cassette to said processing means comprising, (i) first and second pick arms associated with said first and second cassettes, respectively, each pick arm extending generally in the associated first direction and having an end portion adapted to enter said cassette access slot to drivingly engage a rear edge of the foremost film unit in the associated cassette, and (ii) means for driving each pick arm in said first direction thereof between a first limit position where said free end is at said rear edge and a second limit position spaced from said first limit position in said first direction a distance that exceeds the spacing between said discharge slot and said processing means, and driving said pick arms in a direction transverse to said first direction between a film engaged limit position and a film disengaged limit position, said drive means operating to place said first pick arm in said film engaged limit position for advancing said foremost film unit in said first cassette along said first processing path when said first cassette is selected for exposure while simultaneously operating to place said second pick arm in said film disengaged limit position, and operating to place said second pick arm in said film engaged limit position for advancing said foremost film unit in said second cassette along said second processing path when said second cassette is selected for exposure while simultaneously operating to place said first pick arm in said film disengaged limit position.

11. A camera according to claim 10 wherein said drive means includes a pair of rotatable drive wheels each pivotally engaged to a second end of said pick arms at a pivot point radially displaced from the axis of rotation of said drive wheels and means for rotating said drive wheels in unison.

12. A camera according to claim 11 wherein said rotating means includes a reversible motor operatively connected to said drive wheels and said processing means.

13. A camera according to claim 11 wherein said drive wheel pivot point is a pin engaged in an elongated slot formed in said second pick arm end and extending in direction generally transverse to said first direction.

14. A camera according to claim 10 further comprising means urging said first and second arms toward said first limit position and toward said film engaged position.

15. A camera according to claim 11 further comprising switch means to deactivate said rotating means when said drive wheels complete one revolution.

16. A camera according to claim 15 wherein twice the spacing between said pivot point and said axis of rotation at least exceeds the spacing between said cassette discharge slots and said processing means.

* * * * *